United States Patent
Caballero De Ita et al.

(10) Patent No.: US 10,144,428 B2
(45) Date of Patent: Dec. 4, 2018

(54) TRAFFIC LIGHT OPERATION

(71) Applicant: Ford Global Technologies, LLC, Dearborn, MI (US)

(72) Inventors: Carlos Alberto Caballero De Ita, Benito Juarez (MX); Tania Garcia, Ciudad de México/Benito Juarez (MX); Omar Antonio Ramirez Pavon, Portales Norte (MX); Edgar Javier Ortega, Tlalnepantla (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 62 days.

(21) Appl. No.: 15/348,562

(22) Filed: Nov. 10, 2016

(65) Prior Publication Data

US 2018/0126995 A1    May 10, 2018

(51) Int. Cl.
| | | |
|---|---|---|
| *G08G 1/081* | (2006.01) | |
| *B60W 30/18* | (2012.01) | |
| *B60W 10/04* | (2006.01) | |
| *B60W 10/20* | (2006.01) | |

(52) U.S. Cl.
CPC ...... *B60W 30/18154* (2013.01); *B60W 10/04* (2013.01); *B60W 10/20* (2013.01)

(58) Field of Classification Search
CPC . B60W 30/18154; B60W 10/04; B60W 10/20
See application file for complete search history.

(56) References Cited

U.S. PATENT DOCUMENTS

| | | | |
|---|---|---|---|
| 3,725,921 A | 4/1973 | Weidman et al. | |
| 5,781,119 A | 7/1998 | Yamashita et al. | |
| 7,274,306 B2 | 9/2007 | Publicover | |
| 8,977,420 B2 | 3/2015 | Deng et al. | |
| 2004/0260455 A1* | 12/2004 | Dort | G08G 1/096725 701/117 |
| 2005/0137783 A1* | 6/2005 | Dort | G08G 1/096725 701/119 |
| 2006/0155427 A1* | 7/2006 | Yang | G08G 1/07 701/1 |

(Continued)

FOREIGN PATENT DOCUMENTS

| | | |
|---|---|---|
| CN | 202518262 U | 11/2012 |
| CN | 102867422 B | 8/2014 |

(Continued)

OTHER PUBLICATIONS

Günther, et al., "Platooning at Traffic Lights, A Microscopic Simulation Study", Conference Paper, 2016 IEEE Intelligent Vehicles Symposium (IV), Gothenburg, Sweden, Jun. 19-22, 2016 (pp. 1047-1053) (8 pages).

(Continued)

*Primary Examiner* — Jess Whittington
(74) *Attorney, Agent, or Firm* — Frank A. MacKenzie; Bejin Bieneman PLC

(57) ABSTRACT

A plurality of vehicles predicted to pass through an intersection are identified. An acceleration and a start time are assigned for each of the vehicles. The start time is based at least in part on actuation of a traffic light. One or more vehicle subsystems are instructed to be actuated based on the assigned acceleration and the start time upon actuation of the traffic light.

16 Claims, 5 Drawing Sheets

(56) References Cited

U.S. PATENT DOCUMENTS

| | | | |
|---|---|---|---|
| 2008/0012726 A1* | 1/2008 | Publicover | G08G 1/095 340/932 |
| 2010/0060482 A1* | 3/2010 | Emam | G08G 1/09 340/905 |
| 2013/0060456 A1 | 3/2013 | Pourparhizkar | |
| 2013/0179025 A1* | 7/2013 | Deng | B60W 30/165 701/23 |
| 2016/0229409 A1* | 8/2016 | Pascheka | B60W 30/18145 |
| 2017/0363430 A1* | 12/2017 | Al-Dahle | G01C 21/32 |

FOREIGN PATENT DOCUMENTS

| | | | |
|---|---|---|---|
| JP | 3842252 B2 | 8/2006 | |
| JP | 5018030 B2 | 6/2012 | |

OTHER PUBLICATIONS

Search Report from United Kingdom Intellectual Property Office dated Mar. 27, 2018 regarding GB Application No. 1718185.0 (3 pages).

* cited by examiner

TRAFFIC LIGHT OPERATION

BACKGROUND

Vehicles line up (i.e., form a queue) at an intersection when a traffic light indicates that the vehicles must stop. When the traffic light indicates that the vehicles can proceed through an intersection, each vehicle typically begins to move only when the vehicle in front has moved away. Thus, the vehicles far from the traffic light will not begin to move until well after the traffic light has changed, reducing the number of vehicles that can move through the intersection. Such delays cause problems in vehicle operation, e.g., reduced fuel efficiency, increased wear on vehicle parts, etc.

DETAILED DESCRIPTION

A traffic light sensor identifies a plurality of vehicles predicted to pass through an intersection. The traffic light sensor sends data identifying the vehicles to a server. The server assigns an acceleration and start time for each of the vehicles based on the actuation of the traffic light from a red light (indicating vehicles to stop) to a green light (indicating vehicles to go). When the traffic light actuates, each vehicle is actuated to move according to the specified acceleration and start time. By actuating each vehicle's movements at the start time, or at least not waiting until the preceding vehicles have started to move, more vehicles can move through the intersection during the green light, reducing traffic congestion at the intersection. Furthermore, by maintaining the spacing between the vehicles through the intersection, more vehicles can move through the intersection. The server coordinates the vehicles at the intersection to move at the specified acceleration and start time.

Figure 1:
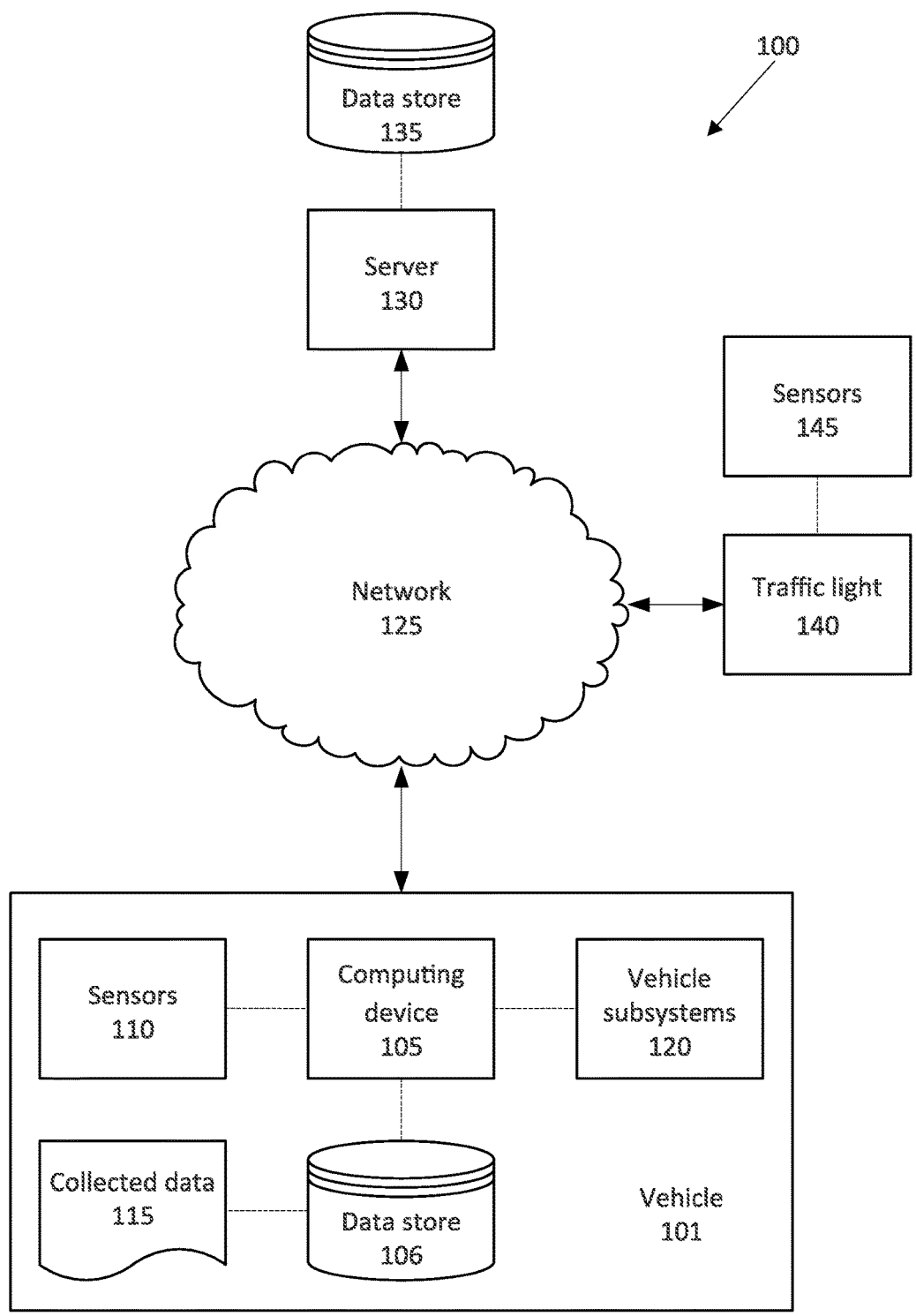
FIG. 1 is a block diagram of an example system for moving vehicles through an intersection.

FIG. 1 illustrates a system 100 for operating a vehicle 101 in, near, and approaching an intersection. A computing device 105 in the vehicle 101 is programmed to receive collected data 115 from one or more sensors 110. For example, vehicle 101 data 115 may include a location of the vehicle 101, a location of a target, etc. Location data may be in a known form, e.g., geo-coordinates such as latitude and longitude coordinates obtained via a navigation system, as is known, that uses the Global Positioning System (GPS). Further examples of data 115 can include measurements of vehicle 101 systems and components, e.g., a vehicle 101 velocity, a vehicle 101 trajectory, etc.

The computing device 105 is generally programmed for communications on a vehicle 101 network or communications bus, as is known. Via the network, bus, and/or other wired or wireless mechanisms (e.g., a wired or wireless local area network in the vehicle 101), the computing device 105 may transmit messages to various devices in a vehicle 101 and/or receive messages from the various devices, e.g., controllers, actuators, sensors, etc., including sensors 110. Alternatively or additionally, in cases where the computing device 105 actually comprises multiple devices, the vehicle network or bus may be used for communications between devices represented as the computing device 105 in this disclosure. In addition, the computing device 105 may be programmed for communicating with the network 125, which, as described below, may include various wired and/or wireless networking technologies, e.g., cellular, Bluetooth, wired and/or wireless packet networks, etc.

The data store 106 may be of any known type, e.g., hard disk drives, solid state drives, servers, or any volatile or non-volatile media. The data store 106 may store the collected data 115 sent from the sensors 110.

Sensors 110 may include a variety of devices. For example, as is known, various controllers in a vehicle 101 may operate as sensors 110 to provide data 115 via the vehicle 101 network or bus, e.g., data 115 relating to vehicle speed, acceleration, position, system and/or component status, etc. Further, other sensors 110 could include cameras, motion detectors, etc., i.e., sensors 110 to provide data 115 for evaluating a location of a target, projecting a path of a parking maneuver, evaluating a location of a roadway lane, etc. The sensors 110 could also include short range radar, long range radar, LIDAR, and/or ultrasonic transducers.

Collected data 115 may include a variety of data collected in a vehicle 101. Examples of collected data 115 are provided above, and moreover, data 115 are generally collected using one or more sensors 110, and may additionally include data calculated therefrom in the computing device 105, and/or at the server 130. In general, collected data 115 may include any data that may be gathered by the sensors 110 and/or computed from such data.

The vehicle 101 may include a plurality of subsystems 120. The subsystems 120 control vehicle 101 components, e.g., a propulsion (including, e.g., an engine, electric motors, etc.) transmission, vehicle seat, mirror, tiltable and/or telescoping steering wheel, etc. The subsystems 120 include, e.g., a steering subsystem, a propulsion subsystem, a brake subsystem, a park assist subsystem, an adaptive cruise control subsystem, etc. The computing device 105 may actuate the subsystems 120 to control the vehicle 101 components, e.g., to stop the vehicle 101, to avoid targets, etc. The computing device 105 may be programmed to operate some or all of the subsystems 120 with limited or no input from a human operator, i.e., in what is referred to as a "fully autonomous" mode. In the fully autonomous mode, that is, each or vehicle propulsion (e.g., including a powertrain with an electric motor and/or internal combustion engine), braking, and steering are controlled by the computing device 105. In a semi-autonomous mode, one or two of these may be controlled by the computing device 105.

When the computing device 105 operates the subsystems 120 without human input in the fully autonomous mode, the computing device 105 can ignore input from the human operator with respect to subsystems 120 selected for control by the computing device 105, which provides instructions, e.g., via a vehicle 101 communications bus and/or to electronic control units (ECUs) as are known, to actuate vehicle 101 components, e.g., to apply brakes, change a steering wheel angle, etc. For example, if the human operator attempts to turn a steering wheel during a steering operation, the computing device 105 may ignore the movement of the steering wheel and steer the vehicle 101 according to its programming.

The system 100 may further include a network 125 connected to a server 130 and a data store 135. The computing device 105 may further be programmed to communicate with one or more remote sites such as the server 130, via the network 125, such remote site possibly including a data store 135. The network 125 represents one or more mechanisms by which a computing device 105 may communicate with a remote server 130. Accordingly, the network 125 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The system 100 further includes at least one traffic light 140 including a computer, i.e., a processor and a memory. Alternatively, the server 130 can be installed in the traffic light 140. The traffic light 140 directs vehicles 101 in an intersection. The traffic light 140 includes at least one sensor 145. The sensors 145 collects data on the vehicles 101 in the intersection. The sensors 145 may include, e.g., cameras, infrared sensors, radar, LIDAR, ultrasonic transducers, etc. The traffic light 140 can send the data from the sensors 145 to the server 130 and to the vehicles 101. The traffic light 140 can include a green light and a red light. The traffic light 140 can actuate the green light to allow vehicles 101 to move through the intersection. The traffic light 140 can actuate the red light to indicate to the vehicles 101 to stop at the intersection. As used here, a "duration" of the traffic light 140 starts upon actuation of the green light (i.e., the light allowing vehicles 101 to proceed) and ends upon actuation of the red light (i.e., the light indicating vehicles 101 to stop). That is, the duration of the traffic light 140 is the time when the traffic light 140 indicates that vehicles 101 can move through the intersection. Alternatively, the traffic light 140 can include lights of other colors that indicate whether vehicles 101 should stop at the intersection or move through the intersection, e.g., a blue light, a blue-green light, a yellow light, etc. The traffic light 140 can further include signs indicating when vehicles 101 should stop or go in the intersection. The traffic light 140 can actuate each of the red light and the green light for a predetermined duration of time to allow vehicles 101 to move through the intersection.

Figure 2:
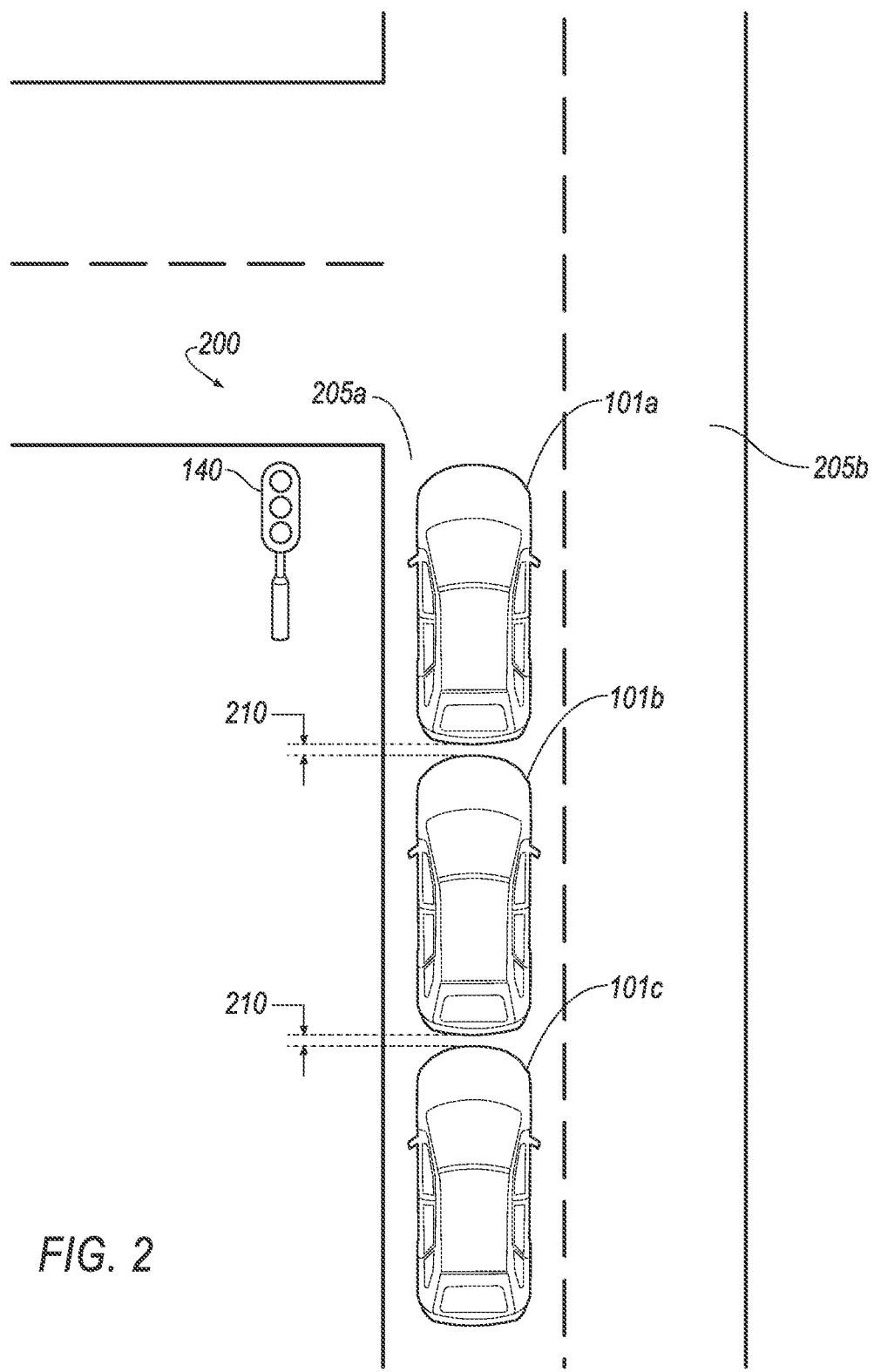
FIG. 2 illustrates an example intersection with vehicles moving in a roadway lane.

FIG. 2 illustrates an example intersection 200. The intersection 200 includes at least one traffic light 140. The traffic light 140 directs one or more vehicles 101 through the intersection 200 by actuating a green light and a red light, as described above. The intersection 200 includes a plurality of roadway lanes 205. The vehicles 101 move in the roadway lanes 205 through the intersection 200.

To move more vehicles 101 through the intersection 200 during the duration of a green light, the server 130 can use data collected by the sensors 145 of the traffic light 140 and assign an acceleration and a start time for each of the vehicles 101 in the intersection. Alternatively or additionally, the server 130 can assign a specified speed for each of the vehicles 101 in the intersection. The start time is a time after the actuation of the green light that the vehicles 101 actuate subsystems 120. For example, the start time can be 2 seconds after the actuation of the green light, or some other time, e.g., 5 seconds, 10 seconds, etc. Thus, when the traffic light 140 actuates the green light, each vehicle 101 moves at the specified acceleration and start time, moving through the intersection 200 before a human operator would move the vehicle 101. As a result, more vehicles 101 can move through the intersection 200 before the duration of the traffic light 140 ends than would move without instructions from the server 130.

The traffic light sensors 145 can detect spacing 210 between the vehicles 101. As used herein, the "spacing" between two vehicles 101 is the shortest distance between two adjacent vehicles 101, e.g., the shortest distance between the front bumper of a first vehicle 101 and the rear bumper of the vehicle 101 immediately in front of the first vehicle 101. Alternatively, the server 130 can instruct each computing device 105 in each vehicle 101 to actuate one or more sensors 110, e.g., radar, LIDAR, etc., to determine the distance between the front bumper of its respective vehicle 101 and the rear bumper of the immediately frontward vehicle 101, i.e., the spacing 210. The computing devices 105 can send a notification to the server 130 over the network 125 indicating the spacing 210.

Based on the spacing 210, the server 130 can determine the number of vehicles 101 that can move through the intersection 200 when the traffic light 140 actuates the green light. As vehicles 101 accelerate through the intersection 200 with human operators, the spacing 210 between the vehicles 101 typically increases, preventing one or more vehicles 101 from moving through the intersection 200 during the green light. Limiting the amount that the spacing 210 increases or decreasing the spacing 210 can allow at least one more vehicle 101 to move through the intersection 200 than would move if the spacing 210 were allowed to increase. That is, by maintaining or decreasing the spacing 210 between the vehicles 101 before the green light actuates, more vehicles 101 can move through the intersection 200.

The server 130 can determine a specified spacing 210 that allows a specific number of vehicles 101 to move through the intersection during the duration of the green light. The specified spacing 210 can be determined by, e.g., a distance required to brake the vehicle 101 to a complete stop at a predetermined speed. The server 130 thus determines the acceleration and/or speed and the start time for each vehicle 101 to maintain the spacing 210 or to decrease the current spacing 210 to the specified spacing 210 between the vehicles 101. As used herein, to "maintain" the spacing 210 means to keep the spacing 210 between the vehicles 101 with a predetermined threshold of the spacing 210 when the vehicles 101 are stopped at the traffic light 140, e.g., 10%, 2 feet, etc.

When the traffic light 140 actuates the green light, the traffic light 140 can send a notification to the vehicles 101 indicating that the green light has actuated. The computing devices 105 in the vehicles 101 then wait until their respective start times relative to the notification of the green light and actuate their respective vehicle subsystems 120 to move through the intersection 200. For example, the computing device 105 can actuate the propulsion to accelerate to the specified acceleration at the specified start time, maintaining or decreasing the spacing 210 between the adjacent vehicles 101 and moving the vehicle 101 through the intersection 200.

FIG. 2 illustrates three vehicles 101a, 101b, 101c moving through the intersection 200. The intersection 200 includes two roadway lanes 205a, 205b. Here, the vehicles 101a-101c are moving straight through the intersection 200, i.e., staying in the current roadway lane 205a. In a typical intersection 200, the first vehicle 101a would actuate vehicle subsystems 120 first, moving through the intersection 200. The second vehicle 101b, upon seeing the first vehicle 101a moving, would then actuate respective vehicle subsystems 120 to move through the intersection 200. Then, only after the first and second vehicles 101a, 101b have started moving, would the third vehicle 101c start to actuate respective vehicle subsystems 120 to move through the intersection 200. Based on the duration of the green light, the third vehicle 101c may not move through the intersection 200 before the traffic light 140 actuates the red light and the vehicle 101c must stop.

Each of the vehicles 101 can send a notification to the server 130 indicating a route that the respective vehicle 101 will follow through the intersection 200. The notification can further include a current spacing 210 between the respective vehicle 101 and the surrounding vehicles 101 as detected by the sensors 110. The traffic light 140 communicates with the server 130 to receive the routes and the current spacing 210 sent by the vehicles 101. Based on the routes of the vehicles 101, the server 130 can determine a specified spacing 210 that the vehicles 101 should maintain. The server 130 can assign an acceleration and a start time for each vehicle 101 to maintain the specified spacing 210 and send a notification to the traffic light 140 including instructions for each vehicle 101. If the current spacing 210 between two of the vehicles 101 is greater than the specified spacing, the server 130 can assign a faster acceleration and/or an earlier start time to the rearmost of the two vehicles 101 to decrease the spacing 210 to the specified spacing 210.

Figure 3:
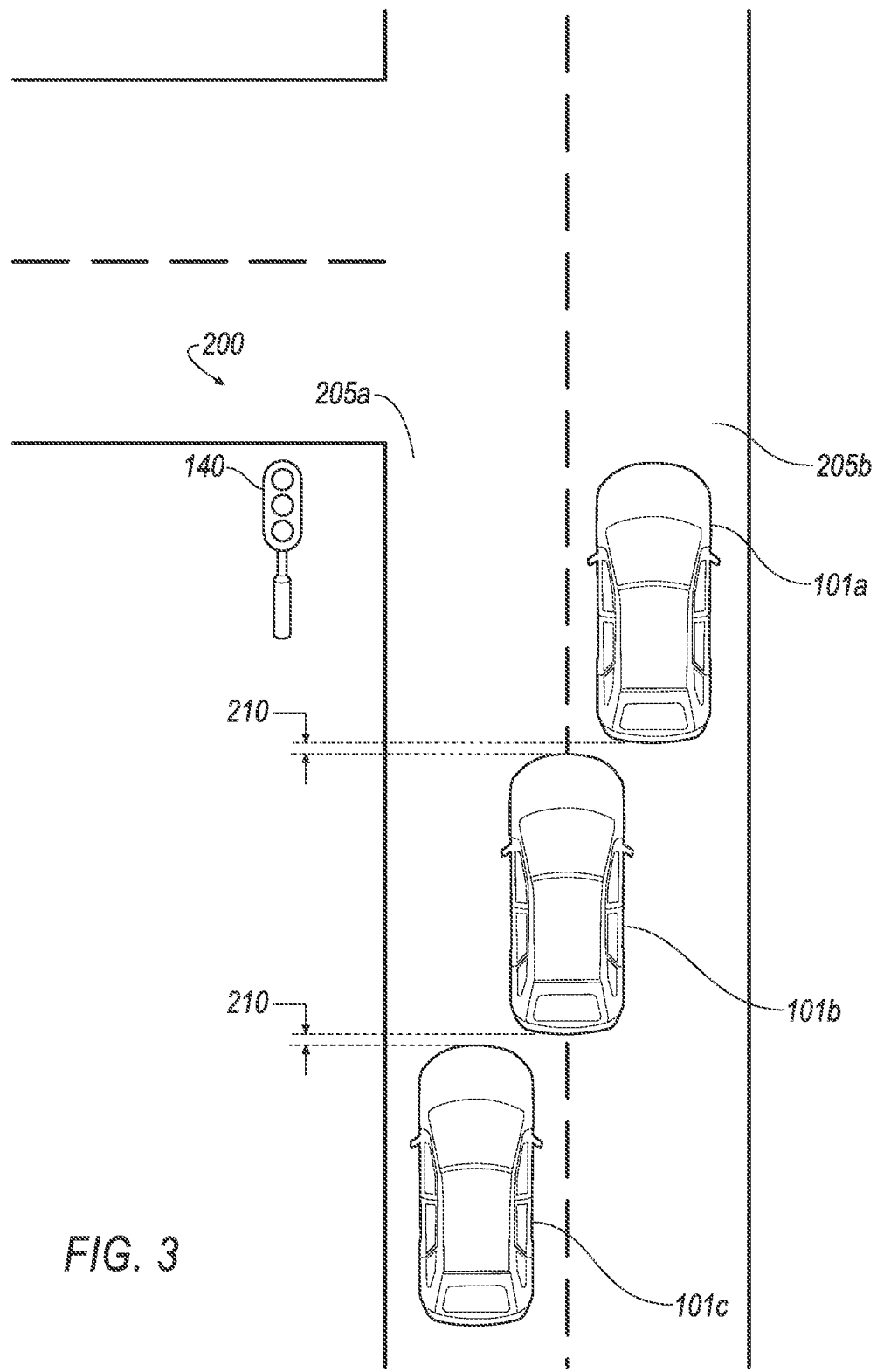
FIG. 3 illustrates the example intersection of FIG. 2 with the vehicles moving from a first roadway lane to a second roadway lane.

Certain routes can affect the number of vehicles 101 that can move through the intersection 200. For example, one of the vehicles 101a may have a route that moves through the intersection 200 in a roadway lane 205a, and another of the vehicles 101b may have a route that changes from the roadway lane 205a to a roadway lane 205b, as shown in FIG. 3. Because the vehicle 101b must change a roadway lane 205, if the route of the vehicle 101c behind the vehicle 101b is straight through the roadway lane 205a, the server 130 can assign a faster acceleration for the vehicle 101c and a start time based on when the vehicle 101b leaves the roadway lane 205a. Furthermore, other vehicles 101 behind the vehicle 101c could then be assigned a faster acceleration and an earlier start time, allowing at least one more vehicle 101 to move through the intersection 200. Alternatively, if the route of the vehicle 101b moves into the adjacent roadway lane 205b, but another vehicle 101 blocks the path of the vehicle 101b in the roadway lane 205b, the vehicle 101b may require more time to move to the roadway lane 205b than to move straight in the roadway lane 205a. The server 130 may thus assign a slower acceleration and/or a later start time for the vehicle 101c and the other vehicles 101 behind the vehicle 101b, and fewer vehicles 101 may move through the intersection 200.

Based on the route for each vehicle 101, the server 130 can determine the number of vehicles 101 that can move through the intersection 200. The server 130 can use the duration of the green light, the current spacing 210 of the vehicles 101, and a predetermined acceleration to predict a number of vehicles 101 that can pass through the intersection 200 while the light is green. That is, based on the acceleration and the duration of the green light, the server 130 can determine a distance from the traffic light 140. The vehicles 101 within the distance from the traffic light 140 can be predicted to move through the intersection 200 when they move at the predetermined acceleration and maintain the spacing 210. Based on whether the routes indicate that the vehicles 101 will remain in their respective roadway lanes 205 or move to another roadway lane 205, the server 130 can adjust the number of vehicles 101 predicted to move through the intersection 200. For example, if all of the routes indicate that the vehicles 101 will remain in their respective roadway lanes 205, the server 130 can assign the same acceleration and start time to move the vehicles 101 straight in the roadway lanes 205. In another example, if one of the routes indicates that at least one vehicle 101 will turn into another roadway lane, the server 130 can assign a steering angle that the computing device 105 actuates a steering subsystem 120 to follow upon actuation of the green light and assign a faster acceleration to the vehicles 101 behind the turning vehicle 101 to move through the intersection 200 when the turning vehicle 101 leaves the current roadway lane 205. That is, when one of the vehicles 101 turns into a different roadway lane 205, the server 130 can assign a faster acceleration and/or earlier start time to the vehicles 101 behind the leaving vehicle 101 to move into the space previously occupied by the leaving vehicle 101.

FIG. 3 illustrates three vehicles 101a, 101b, 101c changing lanes 205 in the intersection 200. The intersection 200 includes a first roadway lane 205a and a second roadway lane 205b adjacent to the first roadway lane 205a. In the example of FIG. 3, the vehicles 101a, 101b, 101c move from the first roadway lane 205a to the second roadway lane 205b in the intersection 200. As described above, the server 130 can determine the spacing 210 between the vehicles 101a-101c and determine the acceleration and start time for each of the vehicles 101a-101c to move through the intersection 200 and from the first roadway lane 205a to the second roadway lane 205b.

In addition to the acceleration and the start time, the server 130 can determine a steering angle for each vehicle 101. That is, to move from the first roadway lane 205a to the second roadway lane 205b, the vehicle 101 must steer into the second roadway lane 205b. The server 130 can determine a steering angle and a time to actuate the steering subsystem 120 to the steering angle to move the vehicle 101 into the second roadway lane 205b.

Based on the routes sent by the vehicles 101 to the server 130, the server 130 can assign a roadway lane 205 for the vehicles 101. For example, the route of the vehicle 101a can indicate that the vehicle 101a should move straight through the intersection 200, i.e., without turning, but the roadway lane 205a where the vehicle 101a is currently located may be a turn-only lane 205. As used herein, a "turn-only" lane is a roadway lane 205 where all of the vehicles 101 in the roadway lane 205 must turn away from the turn-only lane 205, i.e., the roadway lane 205 is designated for vehicles 101 making a specific turn. The server 130 can assign the vehicle 101a to the adjacent roadway lane 205b, which may allow the vehicle 101a to move straight through the intersection 200.

Figure 4:
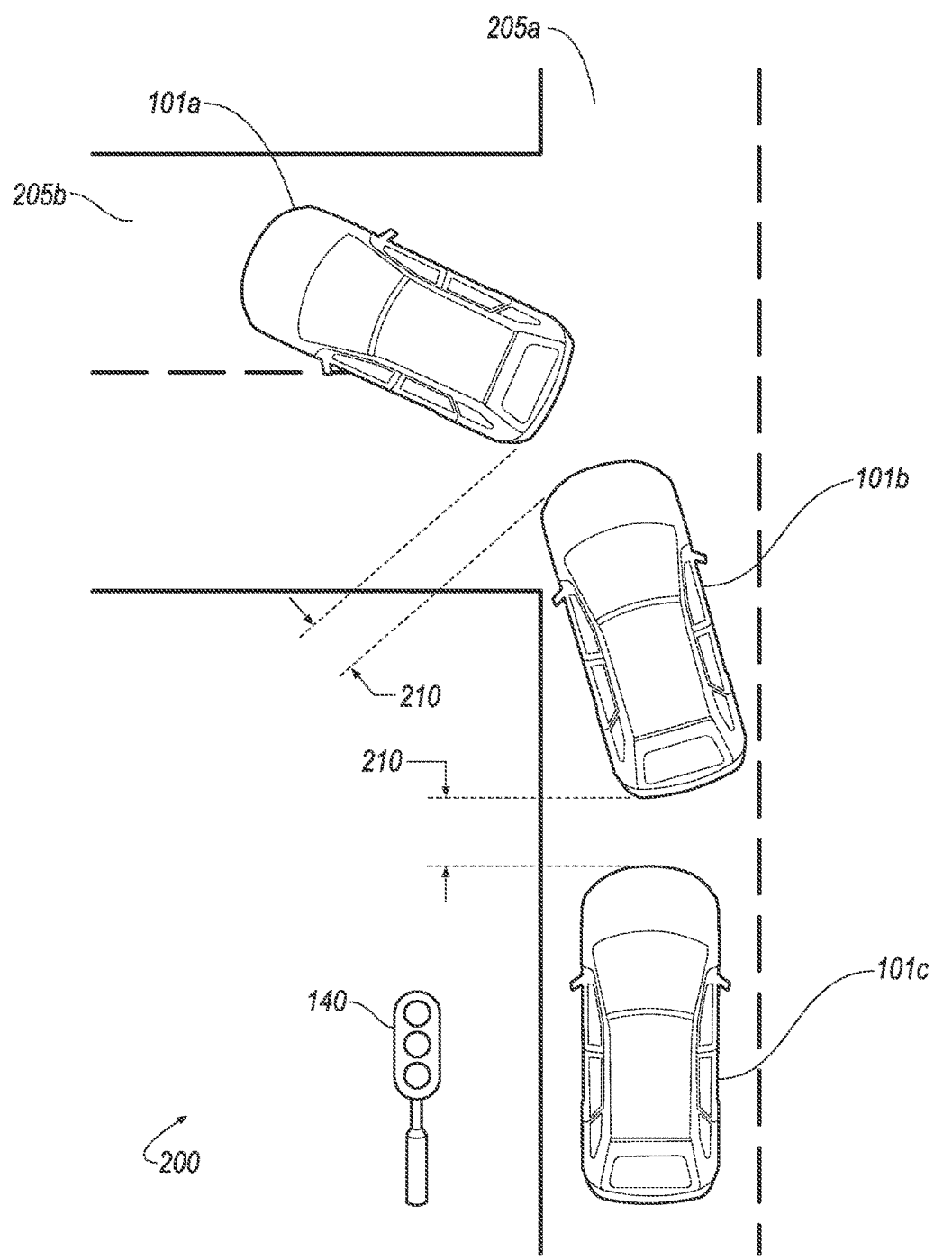
FIG. 4 illustrates the example intersection of FIG. 2 with the vehicles turning through the intersection.

FIG. 4 illustrates three vehicles 101a, 101b, 101c turning in the intersection 200. The vehicles 101a-101c turn from a first roadway lane 205a to a second roadway lane 205b that is transverse to the first roadway lane 205a. For example, as shown in FIG. 4, the second roadway lane 205b is perpendicular to the first roadway lane 205a, and the vehicles 101a-101c perform a left turn to move from the first roadway lane 205a to the second roadway lane 205b.

The server 130 can assign a steering angle for each vehicle 101 that will be performing the turn. That is, in addition to the assigned acceleration and start time, the server 130 can determine the steering angle for each vehicle 101 to turn through the intersection 200 and into the second roadway lane 205b. The server 130 can assign a second time at which the computing device 105 actuates the steering subsystem 120 to the steering angle to turn the vehicle 101 through the intersection 200. Thus, when the traffic light 140 actuates the green light, the computing device 105 actuates one or more subsystems 120 to accelerate to the specified acceleration at the start time and then actuates one or more subsystems 120 to steer the vehicle 101 to the steering angle at the second time. In another example, if the roadway lane 205*a* is a turn-only lane, the server 130 can assign a predetermined steering angle for all of the vehicles 101 in the roadway lane 205*a* that is specified to move the vehicles 101 to the roadway lane 205*b*.

Figure 5:
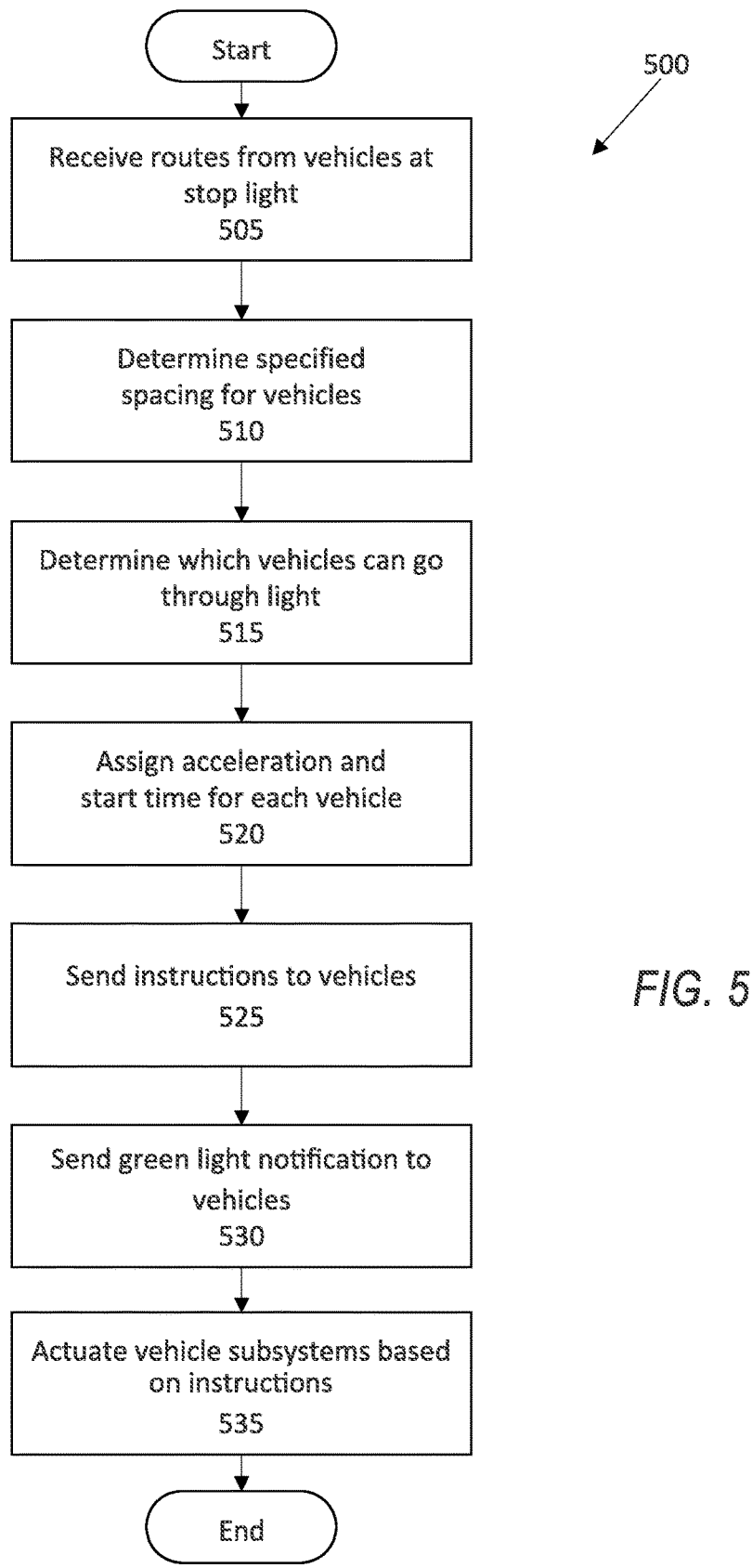
FIG. 5 is a block diagram of an example process for moving the vehicles through the intersection.

FIG. 5 illustrates an example process 500 for moving vehicles 101 through an intersection. The process 500 begins in a block 505, where the server 130 receives the routes from the vehicles 101 stopped at the traffic light 140. Each of the vehicles 101 stopped at the intersection may have a predetermined route, and the computing device 105 of each vehicle 101 can send the route to the server 130. The server 130 can use the routes to determine whether the vehicles 101 will stay in their respective roadway lanes 205, move to an adjacent roadway lane 205, or turn into another roadway lane 205.

Next, in a block 510, the server 130 determines the current spacing 210 between the vehicles 101 and specifies a spacing 210 that the vehicles 101 should maintain. As described above, the traffic light 140 can include one or more sensors 145 to detect the spacing 210 between the vehicles 101. The sensors 145 can determine the spacing 210, e.g., with an image sensor 145, and send the spacing 210 data 115 to the server 130. Alternatively, each computing device 105 of each vehicle 101 can collect the spacing 210 data 115 and send a notification with the spacing 210 to the server 130. Based on the spacing 210 between the vehicles 101, the server 130 can determine which vehicles 101 can move through the intersection 200.

Next, in a block 515, the server 130 determines which vehicles 101 can go through the intersection 200 in the duration of the traffic light 140. Based on the current spacing 210 between the vehicles 101, the specified spacing 210 determined by the server 130, and the duration of the traffic light 140, the server 130 can predict an acceleration that each of the vehicles 101 can attain and determine which of the vehicles 101 stopped at the intersection 200 can go through the intersection 200 while moving to the specified spacing 210. As described above, the server 130 can model the vehicles 101 in the roadway lanes 205 based on their respective routes and a predetermined acceleration and start time. That is, the server 130 determines which vehicles 101 could go through the intersection 200 before the duration of the traffic light 140 ends if the spacing 210 between the vehicles 101 remains constant.

Next, in a block 520, the server 130 assigns an acceleration and a start time for each vehicle 101. Rather than wait for each of the vehicles 101 to sequentially start to move through the intersection 200, thus increasing the spacing 210 between the vehicles 101, the server 130 can move more vehicles 101 through the intersection 200 by assigning a specific acceleration and start time to each vehicle 101. As described above, the specified accelerations and start times allow the computing devices 105 to move the vehicles 101 before a human operator would move the vehicles 101 to maintain the spacing 210 between the vehicles 101. Thus, more vehicles 101 in a fully autonomous mode can move through the intersection 200 than vehicles 101 with human operators. The start time, as described above, is determined relative to the actuation of the green light, e.g., 2 seconds after the green light, 5 seconds, etc.

Next, in a block 525, the server 130 sends a notification with instructions including the assigned acceleration and start time to each of the vehicles 101. The computing device 105 of each vehicle 101 follows the specific instructions from the server 130 to actuate the vehicle subsystems 120 to move through the intersection 200. The computing devices 105 then await the green light to follow the instructions provided by the server 130.

Next, in a block 530, the server 130 sends a notification to the vehicles 101 indicating that the traffic light 140 has actuated the green light. The start time, as described above, is based off of the time that the traffic light 140 actuates the green light. Thus, when the computing device 105 for each vehicle 101 receives the notification that the traffic light 140 has actuated the green light, the computing devices 105 count down to their respective start times.

Next, in a block 535, the computing devices 105 in the vehicles 101 actuate one or more vehicle subsystems 120 according to the instructions received from the server 130. For each vehicle 101, at the designated start time, the computing device 105 actuates one or more vehicle subsystems 120 to accelerate to the specified acceleration to move through the intersection 200. If the server 130 provided a specified steering angle, the computing device 105 actuates the steering subsystem 120 to turn to the steering angle. The process 500 ends after the block 535.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computing devices 105 generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 500, one or more of the steps could be omitted, or the steps could be executed in a different order than shown in FIG. 5. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system, comprising a computer including a processor and a memory, the memory storing instructions executable by the processor to:
   identify a plurality of vehicles predicted to pass through an intersection;
   determine a specified spacing for each of the plurality of vehicles;
   assign an acceleration and a start time to each of the plurality of vehicles based at least in part on actuation of a traffic light to maintain the specified spacing between the plurality of vehicles prior to actuation of the traffic light, at least one vehicle's start time being different from another vehicle's start time; and
   instruct actuation of one or more vehicle subsystems based on the assigned acceleration and start time upon actuation of the traffic light.

2. The system of claim 1, wherein the instructions further include instructions to identify the plurality of vehicles based at least in part on a duration of the traffic light at the intersection.

3. The system of claim 2, wherein the instructions further include instructions to assign the acceleration for each of the plurality of vehicles to move the vehicles through the intersection before the duration of the traffic light ends.

4. The system of claim 1, wherein the instructions further include instructions to assign a steering angle for each vehicle and a time to actuate the vehicle subsystems to steer the vehicle according to the steering angle.

5. The system of claim 4, wherein the instructions further include instructions to assign the steering angle based at least in part on a roadway lane designated for a turn.

6. The system of claim 1, wherein the instructions further include instructions to assign the acceleration and the start time for each of the plurality of vehicles based at least in part on a predetermined route for each of the plurality of vehicles.

7. The system of claim 1, wherein the instructions further include instructions to assign a roadway lane for each of the plurality of vehicles and to instruct actuation of the vehicle subsystems to move the vehicles into the assigned roadway lanes.

8. The system of claim 1, wherein the instructions further include instructions to send a notification to each of the plurality of vehicles with the respective assigned acceleration and the start time.

9. A method, comprising:
   identifying a plurality of vehicles predicted to pass through an intersection;
   determining a specified spacing for each of the plurality of vehicles;
   assigning an acceleration and a start time to each of the plurality of vehicles based at least in part on actuation of a traffic light to maintain the specified spacing between the plurality of vehicles prior to actuation of the traffic light, at least one vehicle's start time being different from another vehicle's start time; and
   instructing actuation of one or more vehicle subsystems based on the assigned acceleration and start time upon actuation of the traffic light.

10. The method of claim 9, further comprising identifying the plurality of vehicles based at least in part on a duration of the traffic light at the intersection.

11. The method of claim 10, further comprising assigning the acceleration for each of the plurality of vehicles to move the vehicles through the intersection before the duration of the traffic light ends.

12. The method of claim 9, further comprising assigning a steering angle for each vehicle and a time to actuate the vehicle subsystems to steer the vehicle according to the steering angle.

13. The method of claim 12, further comprising assigning the steering angle based at least in part on a roadway lane designated for a turn.

14. The method of claim 9, further comprising assigning the acceleration and the start time for each of the plurality of vehicles based at least in part on a predetermined route for each of the plurality of vehicles.

15. The method of claim 9, further comprising assigning a roadway lane for each of the plurality of vehicles and to instructing actuation of the vehicle subsystems to move the vehicles into the assigned roadway lanes.

16. The method of claim 9, further comprising sending a notification to each of the plurality of vehicles with the respective assigned acceleration and the start time.

* * * * *